Oct. 6, 1931.   B. RICHTER   1,826,256
ROTATABLE GAS FILTER
Filed July 29, 1929
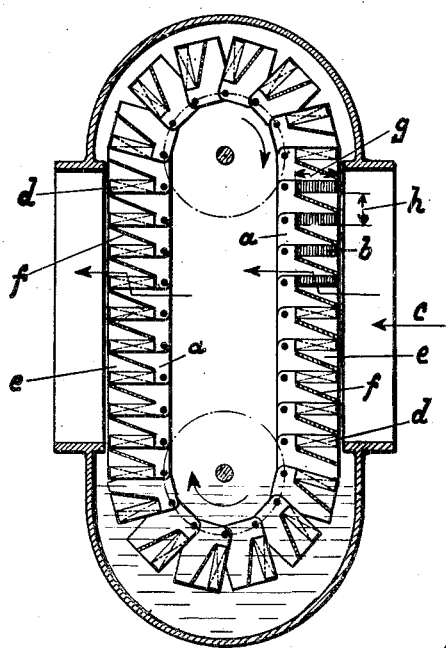
Fig.1
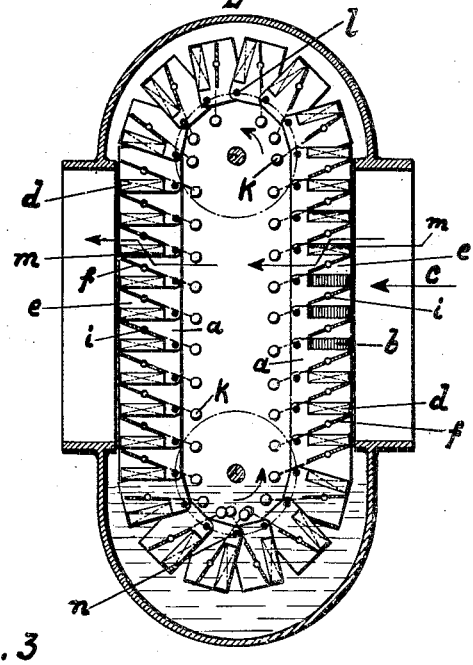
Fig.2
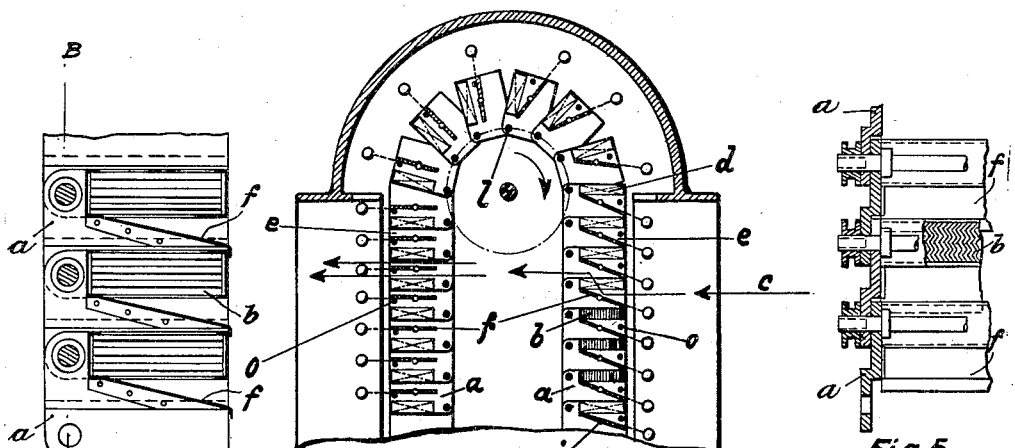
Fig.3
Fig.4.
Fig.5.

Patented Oct. 6, 1931

1,826,256

UNITED STATES PATENT OFFICE

BERNHARD RICHTER, OF BERLIN, GERMANY

ROTATABLE GAS FILTER

Application filed July 29, 1929, Serial No. 381,914, and in Germany August 27, 1928.

This invention relates to a metal filter for cleansing air and gas the peculiarity of which is the automatic removal of the dust separated. Filters of this kind have an endless travelling band running over pulleys at the top and at the bottom and passing through an oil bath in which the separated dust is automatically washed off and the filter element again saturated with oil. These filters are for example built up of individual plates with special profile so that a kind of link chain is formed, or they are composed of a number of elements filled with filtering material moved like paternoster elevators. This last named construction presents various advantages over the first mentioned construction, consisting chiefly therein that the travelling band on the dust laden air side can be moved in upward direction, whereby the dusty filter surface passes into the inside of the filter where it forms a very effective fine filter. Both constructions have the disadvantage of being comparatively expensive. This disadvantage is overcome in the construction according to the application and at the same time the advantage of the paternoster movement is utilized but in an entirely different manner.

An embodiment of the invention is illustrated by way of example in the accompanying drawings in which:

Figs. 1, 2 and 3 are diagrammatic longitudinal sections through different modifications of the filter, Fig. 3 showing only the upper portion.

Fig. 4 shows in elevation the arrangement of several plates in a portion on the endless band.

Fig. 5 is a section on line A—B of Fig. 4.

An endless band $a$ is composed of individual plates $b$ of any suitable shape. Instead of the plates other known filtering material such as Raschig rings, wire gauze, turning chips or the like may be used. The filtering material according to the invention is not placed vertically to the air current $c$ striking against same but it is arranged horizontally or in a plane inclined towards the horizontal. Consequently separate filtering surfaces $d$ are produced on the travelling band and spaces $e$ between these surfaces through which the air current passes to the filter elements through which it does not pass in horizontal direction but in approximately vertical direction from below or from above. The space $e$ is shut off by a plate $f$ to prevent the passage of impure gas, which plate also serves as a guide for the air or gas. It is apparent that with this type of construction the depth $g$ of the filtering surface $d$ can be considerably larger, i. e. its height plus the height of the space. By this means the great advantage is attained of a much lower build than with vertically arranged filtering surfaces.

The plate $f$ according to Fig. 2 is oscillatable, and this forms a further feature of the invention, so that at the movement of the travelling band a series of effects is produced, which result in advantages of great importance. The plate $f$ is rotatably mounted on the pin $i$ so that it can be brought either into the position shown in Figs. 1 and 2 or into the position shown in Fig. 3. The plate $f$ may be held in the desired position for example by a weight $k$ by means of which the centre of gravity of the plate is displaced out of the pivot pin $i$. At the continued movement of the travelling band, which should run from the bottom to the top on the side towards the air admission, the plate after passing the upper reversing point $l$ automatically turns over so that the air or gas current must flow through the filter layers of the rear side of the band which have also been turned, in the same direction from the dusty side to the clean side, as on the front side of the band, so that a carrying off of dust in the cleansed air is effectively prevented. On the rear side of the band the dusty side $m$ of the filter layer is turned towards the inside of the filter and there forms an efficient fine filter. Behind the lower reversing point $n$ the plate again turns over automatically into its initial positions. The weight $k$ may naturally be replaced by any other known arrangement, for example by a spring which positively snaps over at the reversing points.

Owing to the provision of rotatable plates the air or gas current can pass through one side of the belt without having to pass through the filters b. This possibility which is illustrated in Fig. 3 is often advantageous because in this manner the loss of pressure in a circulating filter may be reduced by about one half. This object may also be attained by enlarging the filtering surfaces, but this necessitates considerably higher initial cost and a much larger space for building in the filter, which is often not available. Consequently hitherto it was necessary with filter plants in which only a slight loss of pressure was permissible to use cell filters which only have a single filtering surface and to renounce the advantages of the automatic operation of the travelling filter.

In Fig. 3 the air need not pass through the filter surface of the rear side of the band. This is attained in that the plates f on the rear side of the band encounter a stop o which holds the plates in horizontal position. The air current consequently can no longer flow through the filter layer d but passes into the pure air compartment through the space e where it only encounters slight resistance. It is immaterial whether the travelling band passes from the bottom to the top or vice versa on the side of air admission. The filter layers of the front portion of the band may also be periodically put out of operation in a similar manner by horizontally adjusting the plates. All these different possibilities of adjusting the plates may be effected by hand or automatically and instead of by weights, by other known mechanisms such as springs, guides or the like.

I claim:—

1. A filter for cleansing air and gas with a movable travelling band composed of filter elements, comprising in combination an endless band, a plurality of filter elements arranged horizontally around said travelling band so that the fluid to be cleansed passes through said filter elements in approximately vertical direction, a plate mounted on the travelling band for guiding the flow of the fluid fitted between each two filter elements, said plate passing from the inner lower edge of an upper filter element to the outer top edge of the lower filter element, said plate acting to prevent the fluid to be cleaned from passing through the endless band without passing through the filter elements.

2. A filter as specified in claim 1 comprising in combination with the travelling band, guide plates oscillatably mounted on said travelling band and a pivot pin for each guide plate adapted to be positively displaced during the travel of said travelling band so that by said guide plates the fluid current is diverted and flows through the reversed filter elements on the rear side of the belt in the same direction as in the front portion from the dust removing side to the clean side.

3. A filter as specified in claim 1, comprising in combination with an endless belt and filter elements, plates arranged between each two of said elements, pivot pins carrying said plates, and weights adapted to automatically reverse said plates at the top and bottom during the travel of the band.

4. A filter as specified in claim 1, comprising in combination with an endless band having filter elements arranged around its surface and a shut-off plate between each two of these filter elements, means for adjusting said plates so that the fluid current can pass through both sides of the band and for rendering the filter temporarily inoperative.

5. A filter as specified in claim 1, comprising in combination with the travelling band filter elements and a plate arranged between each two of said elements, stops adapted to engage with and hold said plates on one side of the travel of said band in such a position as to prevent the fluid to be cleansed from passing through the filter elements on this side of the band and to make it flow through the spaces between said filter elements.

In testimony whereof I affix my signature.

BERNHARD RICHTER.